United States Patent [19]

Jain et al.

[11] Patent Number: 4,784,450
[45] Date of Patent: Nov. 15, 1988

[54] APPARATUS FOR GENERATING AND AMPLIFYING NEW WAVELENGTHS OF OPTICAL RADIATION

[75] Inventors: Ravinder K. Jain, Warrenville, Ill.; Knut Stenersen, Stommen, Norway

[73] Assignee: Hughes Aircraft Company, Los Angeles, Calif.

[21] Appl. No.: 660,767

[22] Filed: Oct. 15, 1984

[51] Int. Cl.$^4$ .............................. G02B 6/26; H03F 7/00
[52] U.S. Cl. ................................. 350/96.15; 307/426; 307/430; 350/96.29
[58] Field of Search ............... 350/96.15, 96.29, 96.19; 307/425–430; 370/1, 3

[56] References Cited

U.S. PATENT DOCUMENTS

| | | | |
|---|---|---|---|
| 3,873,825 | 3/1975 | Jones et al. | 370/3 |
| 3,875,422 | 4/1975 | Stolen | 350/96.18 X |
| 4,063,106 | 12/1977 | Ashkin et al. | 307/426 |
| 4,255,017 | 3/1981 | Hasegawa | 350/96.29 |
| 4,401,364 | 8/1983 | Mochizuki | 350/96.15 X |
| 4,616,898 | 10/1986 | Hicks, Jr. | 350/96.15 |

OTHER PUBLICATIONS

Stenersen et al., "Small–Stokes–Shift Frequency Conversion in Single-Mode Birefringent Fibers," *Optics Communications*, vol. 51, No. 2, Aug. 15, 1984, pp. 121–126.

*Primary Examiner*—John Lee
*Attorney, Agent, or Firm*—V. D. Duraiswamy; Kenneth W. Float; A. W. Karambelas

[57] ABSTRACT

Method and apparatus for the tunable generation of new wavelengths of optical radiation from input sources of predetermined wavelength. Optical radiation from a source (20), or sources, is launched into both the fast and slow axis of a birefringent optical waveguide (12) as pump waves. The pump waves generate new Stokes and anti-Stokes waves through enhanced four photon mixing processes. The Stokes wave is wavelength or frequency shifted from the pump wave by a small amount and exits the end of the optical waveguide (12) where it can be interfaced to various apparatus for utilization. The apparatus preferably employs polarization control means for controlling the polarization of optical radiation launched into the birefringent optical waveguide. The waveguide can also be an optical fiber or planar waveguide structure. The wavelength or radiation generated and output can be tuned by altering the birefringence of the waveguide.

38 Claims, 2 Drawing Sheets

APPARATUS FOR GENERATING AND AMPLIFYING NEW WAVELENGTHS OF OPTICAL RADIATION

BACKGROUND OF THE INVENTION

This invention relates to wavelength or frequency shifting and amplification of optical radiation and more particularly to the use of new polarization dependent four-wave-mixing processes to generate new wavelengths of optical radiation. The invention further relates to the use of birefringent single mode optical waveguide fibers for the tunable generation of new wavelengths of optical radiation.

It is very desirable to be able to produce coherent laser-like radiation over a broad spectrum of wavelengths or frequencies. This is based on the fact that a given frequency is often better suited for a particular application than another frequency.

Applications such as interferometry, plasma fusion research, target acquisition or tracking, communications through optical fibers, or medical applications all exhibit wavelength preferences. Each of these applications has an ideal wavelength for which the laws of physics and optics dictate the most efficient transfer functions. In laser fusion work, for example, fuel targets have complex structures which are best penetrated, vaporized, and imploded by particular wavelengths of radiation, depending on their atomic composition. In communications, certain frequencies of optical radiation traverse optical fiber waveguides with lower losses than others. In medicine, it is known that some types of tissue and biological structures absorb particular wavelengths of radiation more readily than others.

Therefore, there have been efforts to provide various sources of coherent radiation which are tunable over a broad range. One approach is the use of dye lasers wherein an amplifying medium consisting of a specialized dye is optically pumped, by a laser source, to produce stimulated emission at a new wavelength. By changing the composition of the dye different output wavelengths are achieved, thus allowing the output wavelength to be tuned.

However, there are at least three drawbacks. Firstly, the frequency control for dye lasers is, as yet, not fully developed and often no dyes are available to reach some wavelengths for a given pump laser. This is due to a relatively large minimum wavelength shift in the dye laser output. Therefore, new wavelengths very close to given input wavelengths cannot be reached. Secondly, dyes have limited lifetimes and require constant replenishment. Thirdly, and perhaps most important, dye lasers are often relatively complex and cumbersome compared to the applications desired.

Another approach is the use of various scattering processes such as Stimulated Raman Scattering (SRS) or Stimulated Brillouin Scattering (SBS). Here gaseous media such as benzene, ammonia, parahydrogen or carbon monoxide interact with photons through molecular or atomic scattering to alter their energy. This produces backward or forward scattered light at new wavelengths. This method typically produces smaller frequency shifts than the dye laser technique. However, the frequency shifts are on the order of 1000 cm$^{-1}$ or more, leaving some wavelengths unreached. Also, Raman cells and SBS media support multiple modes of resonant light, unless special filters or optics are utilized, which are not useful for many optical waveguide applications.

More recently, photon mixing and dispersion processes in optical fibers have been used to produce new wavelengths of optical radiation. This is especially useful in the area of wavelength or frequency shifters, decoders, multiplexers, or interferometers as used in optical fiber communication or processing systems.

One method is illustrated in U.S. Pat. No. 3,875,422 issued to R. H. Stolen, wherein a multimode optical fiber waveguide is used. A pumping beam is launched into two distinct modes of the fiber while a third "signal" beam is also launched into the fiber. The overlapping modes or beams interact in the fiber and through parametric interaction yield an output at a new wavelength. While useful, this method uses multimode fibers in which the interaction is inefficient because of limited spatial overlap of the modes. Also multi-mode fibers are not easily useable with single mode waveguide systems because of the differences in the spatial profiles of the modes.

Another method utilizing single mode fibers is illustrated in U.S. Pat. No. 4,255,017 issued to A. Hasegawa. In Hasegawa, anomalous dispersion of a single mode optical fiber is used to create a modulation instability. The instability creates new sideband waves from an input wave which interact with the input wave in a form of photon mixing. The result is a new wave of new wavelength.

These two methods are an improvement over dye lasers but they do not achieve wavelength shifts much below 1000 cm$^{-1}$. A third technique using optical fibers has been demonstrated by R. H. Stolen et al and is noted in "Phase Matching in Birefringent Fibers," R. H. Stolen, M. A. Bösch, and Chinlon Lin, OPTICS LETTERS, 1981, Vol. 6, No. 5, pp. 213–215.

Stolen et al use a birefringent fiber to establish a differential velocity for a pump wave versus Stokes and anti-Stokes waves produced in an optical fiber waveguide. Stolen et al transmit the pump waves in what is termed the slow axis of a birefringent fiber, to generate a Stokes wave polarized along the fast axis and an anti-Stokes wave also polarized along the fast axis. The net effect is to improve the phase matching of these waves so as to produce parametric interactions (amplification) between them and yield outputs at the Stokes and anti-Stokes wavelengths. This method allows the production of shifts on the order of 500 cm$^{-1}$ in short fibers for efficiencies on the order of 10%. Stolen et al discovered that the Stokes and anti-Stokes waves disappear when the pump waves are launched into the fast axis of the optical fiber.

While this is a further improvement in the art, there is still a desire to achieve smaller wavelength shifts <200 cm$^{-1}$. In addition, higher efficiencies at given powers are needed to provide commercial viability for such wavelength converters.

SUMMARY

In accordance with these and other purposes of the invention, an apparatus and method for generating new wavelengths of optical radiation from input sources of coherent radiation are provided.

In a first embodiment, input radiation is launched by a polarization control means through input means into both the fast and slow axis of a birefringent optical fiber waveguide. The two resulting pump waves interact in enhanced four photon mixing to produce Stokes and anti-Stokes waves along the slow and fast axis of the waveguide, respectively. The Stokes wave is the wave of primary interest and has a frequency shift on the order of 155 cm$^{-1}$ or less. An output means focuses this resulting radiation into other apparatus for utilization.

In a second embodiment, the Stokes wave is produced along the fast axis of the birefringent optical fiber waveguide, although this FPM process has a larger wavelength shift than the first embodiment.

A third embodiment of the invention uses the Stokes wave from the first FPM process to interact with Raman scattered waves polarized along the slow axis of the waveguide to produce another Stokes wave along the fast axis.

A further aspect of these embodiments is the inclusion of multiple wavelength sources for the pump waves yielding both improved control over the FPM processes and higher energy, multiple wavelength, radiation at the output. In addition, polarization control means or other optical elements can direct the multiple wavelengths into parallel apparatus.

These embodiments offer the advantages of improved efficiency of energy conversion to new wavelengths and a much smaller wavelength of frequency shift than previously obtained. In addition, the single mode optical fiber based apparatus interfaces readily with fiber optic technology.

DETAILED DESCRIPTION

Figure 1:
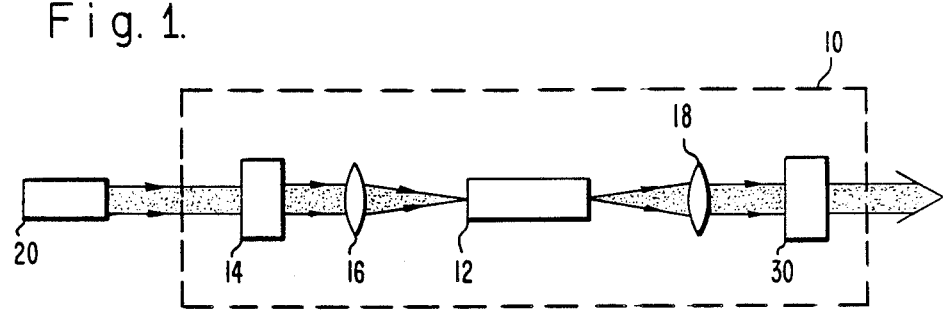
FIG. 1 is a schematic overview of a new wavelength generator apparatus of the invention.

The invention utilizes a new phase matching process for four-photon parametric interactions in single mode birefringent optical waveguides. In commercially available silica optical fibers, this process leads to efficient generation and amplification of new wavelengths of radiation with small Stokes shifts on the order of 100 cm$^{-1}$.

The most commonly used non-degenerate four-photon mixing (FPM) involves two pump photons that are degenerate in frequency, transferring energy to a downshifted photon and an upshifted photon of differing frequencies. The wave of down/up shifted photons is commonly referred to as the Stokes wave and anti-Stokes wave, respectively. They can be designated by subscripts of − and +, representing lower and higher frequencies, respectively, as compared to the input pump wave (or waves). A fully non-degenerate version of this interaction would involve pump photons at different frequencies.

The magnitude of the non-degenerate four-photon interaction is strongly dependent on phase matching or the degree of phase slippage between the three waves (pump, Stokes, anti-Stokes) involved in the interaction. This phase mismatch is caused by material and waveguide dispersion and leads to very inefficient energy transfer, resulting in low or no output of energy at new wavelengths.

To illustrate the phase mismatch, we start with an optical waveguide having two input pump waves (photons) at a single frequency $\omega_p$, a Stokes wave at a frequency $\omega_-$ and an anti-Stokes wave at a frequency $\omega_+$. Since the principal interest is in new wavelengths longer than the pump wave, the phase matching conditions for the partially non-degenerate FPM interaction of interest is:

$$\omega_- = 2\omega_p - \omega_+ \tag{1}$$

and $$k_- = k_{p1} + k_{p2} - k_+ \tag{2}$$

where $k_i$ is the propagation constant or wavevector for the waves. These criteria represent the known conservation of energy (1) and conservation of momentum or phase matching (2) conditions.

The indices of p1 and p2 in Equation (2) indicate that the two pump waves might have the same frequency but reside in different fiber modes. This could be due to different polarizations in a birefringent fiber, from:

$$k_i = 2\pi n_i \Omega_i \tag{3}$$

where $n_i$ is the effective refractive index experienced and $\Omega_i$ the frequencies expressed in cm$^{-1}$ ($\Omega_i = \omega_i/2\pi c$, or 1 cm$^{-1} = 2 \times 10^{-23}$ Joules). It will be assumed for purposes of clarity that all the waves have an initial linear polarization.

For a given frequency shift of $\Omega_s (\Omega_+ = \Omega_p + \Omega_s; \Omega_- = \Omega_p - \Omega_s)$, if all the waves are in the same transverse mode and state of polarization, material and waveguide dispersion would result in a wavevector mismatch, $\delta k$, which (for small values of $\Omega_s$) may be approximated by:

$$\delta k_\parallel = k_+ + k_- - 2k_p \approx \Omega_s^2 \beta \tag{4}$$

where $$\beta = 2\pi (\lambda)_p D(\lambda) \tag{5}$$

where $D(\lambda)$ is the group velocity dispersion ($\lambda^2 d^2 n/d\lambda^2$) and $\beta$ is a constant, mismatch parameter. $\beta$ is dominated at visible wavelengths in a silica optical fiber by material dispersion and has a value of approximately $2.3 \times 10^{-5}$ cm.

Decreasing $D(\lambda)$ decreases the phase mismatch $\delta k_\parallel$. Therefore, to promote phase matching, the velocities or wavevector parameters of the waves, need to be altered relative to each other.

A birefringent media has two modes of polarization or two principal axes with differing indices of refraction, which can be employed to alter the relative wave velocities. This is possible because waves traveling through such a medium experience a different influence on their velocity depending on which refractive axis or polarization mode they are aligned with. Typically the axis of a birefringent medium are labeled fast and slow to denote the relative speed for a given wavelength of radiation along that axis. A wave polarized along the fast axis experiences a lower index of refraction and one polarized along the slow axis experiences a higher index.

As previously discussed, Stolen et al use a birefringent optical fiber waveguide to establish parallel optical paths in a medium having two polarization modes. The pump waves, $\omega_p$, are launched into the fiber with a linear polarization along the slow axis, with both the Stokes and anti-Stokes waves being polarized along the fast axis.

For the Stolen et al arrangement, Equation (2) becomes:

$$k_-{}^f = 2k_p{}^s - k_+{}^f \qquad (6)$$

where s and f denote wave polarization along the slow and fast axis, respectively.

This method allows frequency shifts, $\Omega_s$, in the range of 420 to 970 cm$^{-1}$ with a fiber birefringence in the range of 2.5 to $9.7\times10^{-5}$, respectively. Stolen et al found that launching pump waves into the fast axis produced no Stokes or anti-Stokes wave output and no apparent parametric interactions.

I have discovered a new method of using polarized radiation in a birefringent optical waveguide to generate smaller wavelength-shifted radiation. This new method also results in a higher efficiency of parametric interactions and wave generation in a birefringent optical fiber.

Using different polarizations for the pump, Stokes, and anti-Stokes waves so that the pump wave experiences a net slowing or increase in $k_i$ relative to the Stokes and anti-Stokes waves, a new phase matched FPM process occurs. For predetermined pump wave polarizations and the correct optical fiber length, there is supported Stokes and anti-Stokes waves in the correct polarizations for producing a new frequency shift.

First Embodiment

For the method of this invention, I launch two pump waves concurrently into both the fast and slow axis of a birefringent optical waveguide. The Stokes and anti-Stokes waves generated are aligned along the slow and fast axis, respectively, and the phase matching criteria is:

$$k_-{}^s = k_{p1}{}^f + k_{p2}{}^s - k_+{}^f \qquad (7)$$

If the Stokes and anti-Stokes waves deposit energy into other axis, waves created are not enhanced by parametric interactions and amplification. In that case, waves created along other axes dissipate within a short distance. Therefore, for the FPM process of interest, the Stokes and anti-Stokes waves are aligned with the slow and fast axis, respectively.

Neglecting the wavelength dependence of the fiber birefringence $\delta n$ (which is very small at the desired frequencies), the frequency shift $\Omega_s$ for the FPM process of Equation (7) occurs when:

$$\Omega_s = 2\pi\, \delta n/\beta \qquad (8)$$

For $\delta n = 1^{-4}$ and $\beta = 2.4\times 10^{-5}$, the frequency shift of this process is on the order of 26 cm$^{-1}$ which is in strong contrast to the 500 to 1000 cm$^{-1}$ previously achieved.

An apparatus for practicing the method of the invention described above and establishing the improved FPM process of Equation (7), is illustrated in FIG. 1.

Referring now to FIG. 1, radiation from a source 20 enters new wavelength generator 10, where it is launched into the appropriate axis of a birefringent optical waveguide fiber 12 by a polarization control means 14 and input means 16.

In this embodiment, source 20 is a coherent source of radiation operating with a narrow band of frequencies around a frequency $\omega$. Source 20 can be one of several types of lasers—gas, dye, solid state—whose output frequency is close to the range of interest. Source 20 provides the pump waves for the process of Equation (7). Therefore, the single wave $\omega_p$ must be turned into pump waves, $\omega_{p1}$ and $\omega_{p2}$, having different polarization modes $k_{p1}$ and $k_{p2}$, respectively.

The creation of two phase-matched pump waves from a single wave source can be achieved in several ways including the use of beam splitters and polarization rotators, as known in the art. However, for low distortion phase-matched interfacing with optical fiber 12, a minimum number of optical parts is desired. One possible technique is the use of a birefringent material (not shown) disposed along the optical path of source 20. Such a material produces two polarized waves, $\omega_{p1}$ and $\omega_{p2}$, oriented perpendicular to each other from a single unpolarized wave $\omega$ (from source 20). The orientation of $\omega_{p1}$ and $\omega_{p2}$ with respect to the axis of waveguide 12 is controlled by rotation of the birefringent material, if necessary.

Figure 2:
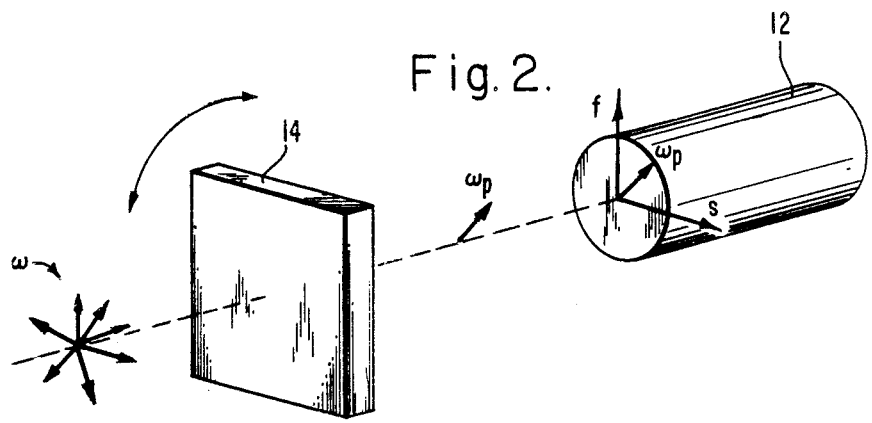
FIG. 2 is a representation of a diametrical cross-section of a birefringent fiber and polarization means combination.

The preferred embodiment uses a polarization control means 14 and takes advantage of the natural structure of birefringent materials to achieve the creation of two pump waves. Polarization control means 14 creates a single linearly polarized pump wave $\omega_p$ from the source 20 radiation, whose polarization is at an angle with respect to one of the modes or axis of waveguide 12. This is illustrated in FIG. 2 where wave $\omega_p$ strikes waveguide 12 at an angle with respect to the fast and slow axis, f and s, respectively.

In order to produce and rotate a polarized wave, polarization means 14 can be optical apparatus known in the art such as, but not limited to, a Glan-Thompson polarizing prism and/or a half-wave plate polarization rotator. Alternately, apparatus such as an electro-optical crystal can be used. In this latter case, electrodes on the electro-optic medium powered by a programmable voltage control the polarization or rotation of the pump wave. This allows a more precise and refined control over the amount of energy deposited in each polarization mode or axis and the possibility for feedback control when combined with output sensing elements. This may provide increased benefit for particular applications, but has power transfer limitations through the electro-optic medium.

Polarized radiation encountering an optical waveguide at an angle to a polarization mode will deposit energy into that mode dependent upon the angle of separation between $\omega_p$ and the waveguide mode. The smaller the angle the greater the transfer of energy into that polarization mode.

In a birefringent silica optical fiber, the polarization modes are perpendicular or 90° apart. Polarized radiation encountering the optical fiber at an angle $\alpha$ with respect to one mode is at a complementary angle $(90° - \alpha)$ to the other mode and some of the optical energy of the polarized pump wave $\omega_p$ is deposited into each mode. Therefore, by rotating $\omega_p$ to an angle of 45° with respect to either mode or axis, $\omega_p$ overlaps each mode by approximately 50% in terms of energy transfer. This creates two pump beams, $\omega_{p1}$ and $\omega_{p2}$, of approximately equal optical energy propagating along the separate axes.

The preferred embodiment uses an angle of 45° for the rotation, but it is not necessary to have equal optical power in the two polarization modes for the operation of the invention. However, rotating or aligning $\omega_p$ too close to one axis of optical waveguide 12 reduces the efficiency of the wavelength conversion. From a practical standpoint, $\omega_p$ must have a minimum angle with respect to either waveguide 12 axis of around 5°.

Returning to FIG. 1, new wavelength generator 10 also includes input means 16 positioned adjacent to waveguide 12 and disposed between polarization control means 14 and the waveguide. Input means 16 launches radiation from polarization control means 14 into waveguide 12. A representative input means is a 20X microscopic element or lens which is known in the art to provide excellent focusing of optical radiation into optical fiber waveguides. It is necessary that the focused light be within the numerical aperture for the given waveguide used. Therefore, any lens element utilized will have to use a particular focal length based on the waveguide aperture and the position available for source 20 and input means 16.

After radiation from polarization control means 14 is launched into waveguide 12 by input means 16, it becomes waves $\omega_{p1}$ and $\omega_{p2}$ which propagate along the fast and slow axis of waveguide 12. FPM takes place in waveguide 12 and the new Stokes and anti-Stokes waves are generated according to Equation (7) above.

However, consideration must be given to the fact that there are scattering processes such as SRS that can compete with the preferred FPM process. In order to enhance the effective gain of the FPM interactions relative to these scattering processes, the FPM gain bandwidth $\delta\Omega$ must be greater than or equal to the pump bandwidth, $\delta\Omega_p$. Since:

$$\delta\Omega = \pi/2\beta\Omega_s L \quad (9)$$

there exists an optimal length, $L_{opt}$, given by:

$$L_{opt} = \pi/(2\beta\Omega_s \times \Omega_p) \quad (10)$$

for which FPM gain satisfies this requirement and maintains the efficiency of the FPM process.

For a birefringence of $\delta n = 10^{-4}$ and a dispersion of $\beta = 2.4 \times 10^{-5}$, the optimum optical waveguide length for waveguide 12 is approximately 1.82 meters. Therefore, the preferred embodiment utilizes optical fiber waveguides that are in the range of 1.75 to 3 meters in length to be close to the optimal length.

Another consideration in choosing a particular fiber for use as waveguide 12 is the dependence of $\Omega_s$ on the value of the birefringence. From Equations (8) and (5) we see that the frequency shift is directly proportional to the waveguide birefringence. Therefore, the desired shift in wavelength and its tuning can be achieved by varying the magnitude of the waveguide birefringence.

The birefringence of an optical fiber can be a function of the material used, such as quartz, or induced stress in the fiber structure. The preferred embodiment of the present invention contemplates the use of a stressed silica core optical fiber waveguide. The stress in the silica core fiber can be induced by techniques known in the art. One technique is to manufacture the fiber with elliptical stress lobes. A second technique is to deposit a metallic coating on the fiber at an elevated temperature, which has a substantially different coefficient of expansion. The metallic coating causes stress in the fiber by contraction upon cooling to normal operating temperatures.

The birefringence can be altered by further stressing the fiber mechanically (and inversely by reducing such added stress appropriately). If the fiber is wound on a form, say of cylindrical cross-section, it is possible to alter the stress in the fiber by expanding or constricting the dimensions of the form.

Another method of altering the birefringence is that of heating the fiber to reduce the stress in the glass structure by allowing some mobility to atoms in the glass matrix. While there are several heating means possible from an immersion bath of temperature controlled oil to a simple resistive element, a preferred method would be a metallic coating with a minimum resistive value driven by an electrical power source. This would function to reduce the apparatus necessary for temperature control while further reinforcing the fiber for applications where needed. In addition, this takes advantag of fibers stressed by metallic coatings, provided the cladding has the required resistance.

While very small frequency shifts are desired, a very small birefringence $\delta n$ is not. Small values of birefringence, on the order of $10^{-6}$ or less, are overridden by random scattering within an optical fiber over distances of a few meters, thereby preventing the FPM enhancement. This limitation on the smallest magnitude of birefringence that can be used for a practical embodiment of a wavelength converter based on FPM in optical waveguides is the reason why my technique is strongly preferred to that of Stolen et al. The desired wavelengths or small frequency shifts are obtained by making the birefringence large, on the order of $10^{-5}$ to $10^{-4}$, or larger.

Therefore, the birefringence of the optical fiber waveguide can be controllably altered, as described above, in order to selectively shift the wavelength of the generated Stokes and anti-Stokes radiation.

As shown in FIG. 1, the new wavelength radiation generated by this FPM process exits from the other end of waveguide 12, which must be interfaced to other apparatus for transmitting or using the generated wave. Output means 18 is provided adjacent to this "output" end of waveguide 12, in order to facilitate radiation transfer, although not always necessary. Output means 18 serves to match the divergent beam produced by the numerical aperture of waveguide 12 with the angle of acceptance of other apparatus. A representative output means 18, like input means 16, is a 20X microscopic lens as typically used in the art.

Although not necessary for the apparatus and method of the invention, wavelength generator 10 can furthe include a polarization control means 30 adjacent to output means 18. Since the transfer of energy to the new wavelength from the pump wave is not 100% efficient, there is some percentage of the other waves, $\omega_p$ and $\omega_+$, exiting waveguide 12 along with the new desired wave, $\omega_-$. Since these waves usually have a different polarization than $\omega_-$, a polarization control means 30 can be used to discriminate against these waves to the exclusion of the new wavelength $\omega_-$. Alternatively, $\omega_p$ and $\omega_+$ can be selectively deflected, as by a prism, into other apparatus separate from that of $\omega_-$.

EXAMPLE I

I used a synchronously mode-locked, cavity-dumped Rh6G dye laser as radiation source 20, operated at peak powers of 1.5 KW and pulse lengths of 15 picoseconds. This produced a pump wave of approximately 585 nm wavelength and a bandwidth of approximately 3 cm$^{-1}$.

Several single mode, silica core fibers 2 to 3 meters long were employed with core diameters of 4 μm, a "bow-tie" type stress lobe structure and a $\delta n$ of $5.5 \times 10^{-4}$. A Glan-Thompson polarization rotator was used for polarization control means 14.

The Stokes wave produced had a frequency shift of approximately $150 \pm 10$ cm$^{-1}$ with respect to the pump wave, compared to a predicted 143 cm$^{-1}$ for this birefringence.

The peak output powers obtained for a 1 KW input power were 300 W for a conversion efficiency of 30%, better than the 10% typically obtained previously with optical fibers excited by comparable pump intensities.

Stokes shifts in the 100 to 500 cm$^{-1}$ range compare well with those produced in multi-mode fibers. However, single mode fibers have the advantage of confining the optical power to higher densities and providing large mode overlap for wave interactions, besides resulting in clear TEM$_{00}$ like modes at the new wavelengths. Thus, several wavelength generators can be used in series or combined with efficient SRS amplifiers.

Second Embodiment

Different applications determine whether only the new wavelength wave alone is needed or some combination including $\omega_p$. Examples are, advanced communications where a single up- or down-converted wavelength is needed ($\omega_-$), in contrast to multiple wavelength sources ($\omega_p$, $\omega_+$, $\omega_-$) for frequency multiplexers or encoders.

In some applications, $\omega_p$, $\omega_-$, and $\omega_+$ are all used for parallel processing or contemporaneous functions. Using the method and apparatus of the present invention, $\omega_p$ generates a three frequency output that is capable of activating or controlling multiple frequency-dependent, substantially simultaneous processes or functions. However, greater control may be needed over the production of the Stokes and anti-Stokes waves as well as increased power output.

In such applications, the radiation at the desired anti-Stokes or Stokes wavelengths can be launched into waveguide 12 along with the pump waves. This allows controlled reinforcement of, or feedback control over, the generation of new wavelengths; improved efficiency of converting the pump energy to a new wavelength; and higher power output at the Stokes and anti-Stokes wavelength. The exact energy level of the Stokes and anti-Stokes pumps will depend on the particular application and whether these pumps are used either to augment and control or as high energy drivers themselves.

Figure 3:
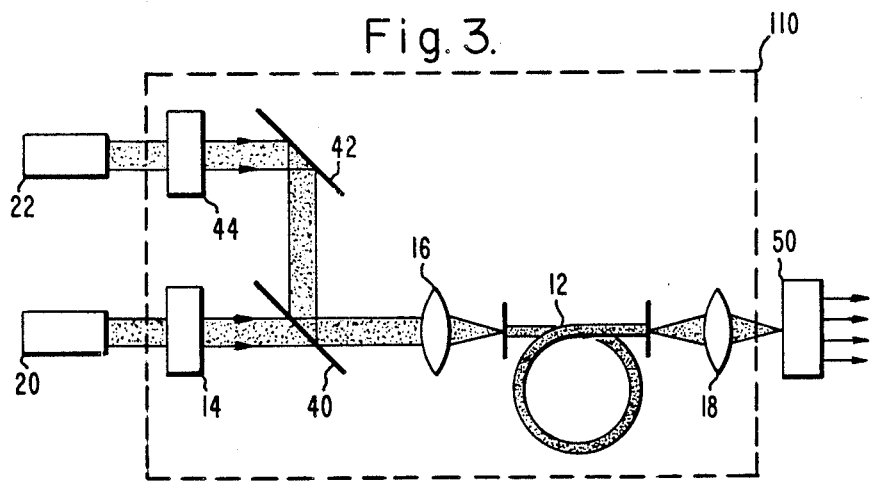
FIG. 3 is a schematic overview of a wavelength generator and multiple wavelength output apparatus of the invention.

This is illustrated in FIG. 3 where an additional input source 22 is used in association with input source 20 and wavelength generator 110. The sources need not be independent if a single two or three wavelength source, using as for example dye lasers, can be constructed for the wavelength conversion of interest.

With two wave sources 20 and 22 directing at least two waves $\omega_p$ and $\omega_+$ into wavelength generator 10, two polarization control means 14 are required for controlling the polarization of the source waves. Polarization control means 44 includes a means to rotate or orient the polarization of the input waves similar to polarization means 14. However, this embodiment further includes mirrors or prisms 40 and 42 to combine the polarized waves before being focused by input means 16 into waveguide 12. The remainder of the input and internal FPM processes are the same as in the totally passive case for the Stokes and anti-Stokes wave generation.

Once the waves exit waveguide 12, polarization control means 50 is used to separate and direct the output waves as desired. Polarization control means 50 can be, but is not limited to, an optical waveguide grating or coupler as known in the art, which directs light into different channels of a multi-channeled coupler depending on the frequency of the light. This allows the output waves to be directed into integrated optical electronic apparatus or optical waveguides for further use.

Third Embodiment

The preferred embodiments described above employ a birefringent optical fiber waveguide as the medium for the desired FPM process. However, it is not necessary to employ an optical fiber and in some applications, a planar waveguide structure may be preferred. In this case, an entire source, generator, and optical coupler can be integrated onto a single substrate. This has advantages for integrated optical processing.

Figure 4:
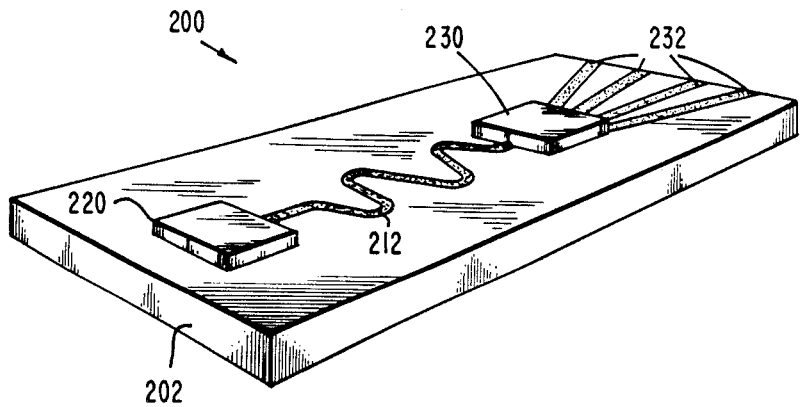
FIG. 4 is a representation of a solid state, optical wavelength generator apparatus according to the invention.

In FIG. 4 an integrated wavelength converter device 200 is illustrated having a radiation source 220, a planar waveguide 212 and optical coupler 230.

Radiation source 220 is a solid state laser, such as a GaAs laser, positioned on a substrate 202. Source 220 is manufactured and/or positioned on substrate 202 using techniques known in the art. It is possible to construct source 220 so that the output radiation is polarized along a particular mode or axis with respect to waveguide 212 obviating the need for a separate polarization control means.

Waveguide 212 can be constructed from various materials known in the art to produce a birefringent planar waveguide. The material used for waveguide 212 must have a wider bandgap than the material used for the solid state laser. A representative material, in the case of a GaAs laser, is AlGaAs. The shape of waveguide 212 is illustrated as a serpentine line in order to obtain a maximum length versus substrate distance or size. However, the nonlinear effects that drive the FPM process in a material, such as AlGaAs, are much greater than those of glass optical fibers. This means that a shorter waveguide may be used to achieve the same degree of efficiency or parametric amplification. Therefore, in some applications the waveguide can be shorter or a straight line.

For this embodiment there is no requirement that input means or output means be incorporated since the radiation source and other apparatus can be directly interfaced to the planar waveguide. However, it is also possible to incorporate such elements for particular applications.

In FIG. 4 an optical waveguide coupler 230 is shown as representative of a device that would be interfaced to waveguide 212 to use or manipulate the new wavelength radiation output from waveguide 212. In this embodiment such devices can be constructed immediately adjacent to waveguide 212 with the attendant advantage of compact integrated optical processing.

Fourth Embodiment

In addition to the phase matching criteria of Equation (7) used in the above embodiments, it is also possible to generate another frequency shifted wave using a different polarization for the Stokes wave. The pump wave, $\omega_p$, is launched into both polarization modes as before. However, for an anti-Stokes wave generated along the fast axis having a larger frequency shift than generated above, a Stokes wave is generated and supported along the fast axis. The phase matching relationship for this FPM process is:

$$k_-{}^f = k_{p1}{}^s + k_{p2}{}^f - k_+{}^f \quad (11)$$

with the solution for the new Stokes shift $\Omega_s'$:

$$\Omega_s' = 2\pi\,\delta n \Omega_p = \Omega_s \cdot \Omega_p \quad (12)$$

This frequency shift is not as small as that of Equation (8) nor as useful for many applications. The frequency shift of Equation (10) is, however, accomplished with greater efficiency than by previous methods and represents an improvement over such methods. Therefore, it is useful for many larger frequency shift applications.

Fifth Embodiment

The embodiments and method of generating new wavelengths of radiation so far described are useful for increased efficiency production of small frequency shifted radiation starting mainly with a single pump wavelength. This is a partially degenerate FPM process.

However, I also discovered that the FPM process of Equation (7) can be used to support a new fully non-degenerate FPM process. In the simplest implementation of such a process, three waves are input at different frequencies, two polarized along a first axis and the third along the second axis resulting in a fourth wave along the second axis. I have used the fully non-degenerate FPM process along with Stimulated Raman scattering to generate a new Stokes wave $\omega_-$.

EXAMPLE II

Using the same apparatus and parameters as in Example I above, with a $\omega_{p1}$ frequency of 16,700 cm$^{-1}$, a $\omega_{p2}$ frequency shifted by 450 cm$^{-1}$, and a $\omega_-$ frequency shifted by 100 cm$^{-1}$, I produced a new wave with a frequency shift of 350 cm$^{-1}$.

The foregoing descriptions of preferred embodiments of the invention have been presented for purposes of illustration and description. They are not intended to be exhaustive nor to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. A method of generating new wavelengths of optical radiation comprising:
    launching coherent input optical radiation having predetermined polarization concurrently into both the fast and slow axes of a birefringent optical waveguide having predetermined birefringence in such a manner as to generate Stokes and anti-Stokes waves along the slow and fast axis, respectively, of said waveguide, each said Stokes and anti-Stokes wave having a wavelength differing from the wavelength of said input optical radiation.

2. The method of claim 1 wherein said step of launching optical radiation comprises the steps of:
    providing at least one source of narrowband laser radiation having a predetermined wavelength;
    disposing said birefringent optical waveguide having a predetermined birefringence with a fast and a slow axis along the optical path of said predetermined wavelength radiation; and
    focusing said predetermined wavelength radiation into said birefringent optical waveguide so as to transfer a predetermined percentage of said predetermined wavelength radiation into both the slow and fast axis of said waveguide.

3. The method of claim 2 wherein the step of providing a source of narrowband laser radiation comprises the step of providing a solid state laser immediately adjacent to one end of said waveguide.

4. The method of claim 2 wherein the step of disposing said birefringent optical waveguide comprises the step of disposing an optical waveguide having a birefringence greater than $1.0 \times 10^{-6}$ along said optical path.

5. The method of claim 4 wherein said optical waveguide has a birefringence greater than $1.0 \times 10^{-5}$.

6. The method of claim 2 wherein the step of disposing an optical waveguide along the optical path of said predetermined wavelength radiation comprises the step of disposing a birefringent optical fiber waveguide along said optical path.

7. The method of claim 6 wherein the step of disposing a birefringent optical fiber waveguide comprises disposing a birefringent silica optical fiber waveguide along said optical path.

8. The method of claim 6 wherein the step of disposing a birefringent optical fiber waveguide comprises the step of disposing a single-mode birefringent optical fiber waveguide.

9. The method of claim 2 wherein the step of focusing said predetermined wavelength radiation into said waveguide further comprises:
    disposing input means adjacent to the input end of said waveguide; and
    disposing polarization control means between said radiation source and said input means for controlling the mode of polarization of radiation input to said waveguide.

10. The method of claim 2 further including launching optical radiation having the wavelengths of said desired Stokes and anti-Stokes waves, respectively, into said waveguide, so as to enhance and control the four photon mixing within said waveguide.

11. The method of claim 1 further comprising the step of controllably altering the degree of birefringence of said optical waveguide.

12. The method of claim 1 wherein said step of launching optical radiation comprises the steps of:
    providing at least one source of narrowband laser radiation having a first and a second predetermined wavelength;

disposing said optical waveguide of predetermined birefringence with a fast and a slow axis along the optical path of said first wavelength radiation;

focusing said first wavelength radiation into said waveguide so as to transfer a predetermined percentage of said first wavelength radiation into the slow axis of said waveguide; and focusing said second wavelength radiation into said waveguide so as to transfer a predetermined percentage of said second wavelength radiation into the fast axis of said waveguide.

13. The method of claim 12 wherein the step of providing a source of narrowband laser radiation having a first and a second predetermined wavelength further comprises the step of positioning two solid state lasers immediately adjacent to said waveguide.

14. The method of claim 12 wherein the step of disposing said optical waveguide of predetermined birefringence further comprises the step of disposing a birefringent optical fiber waveguide along said optical path.

15. The method of claim 12 wherein the step of disposing said optical waveguide of predetermined birefringence further comprises the step of disposing a birefringent planar optical waveguide along said optical path.

16. The method of claim 12 wherein the steps of focusing said first and second wavelength radiation into said waveguide further comprises:

disposing input means adjacent to the input end of said waveguide; and disposing polarization control means between said radiation source and said input means so as to control the mode of polarization of radiation input to said waveguide.

17. The method of claim 12 further including the step of altering the birefringence of said waveguide by a predetermined amount.

18. The method of claim 12 further comprising the step of coupling optical radiation exiting said waveguide at said first, second, Stokes and anti-Stokes wavelengths into separate optical paths.

19. The method of claim 1 further comprising the step of generating Raman scattered waves along said slow axis, and second Stokes waves along said first axis through enhanced phase matched four photon mixing.

20. The method of claim 2 wherein the step of disposing an optical waveguide along the optical path of said predetermined wavelength radiation comprises the step of disposing a birefringent planar optical waveguide along said optical path.

21. A method of generating new wavelengths of optical radiation comprising:

launching coherent optical radiation concurrently into both the fast and slow axis of a birefringent optical waveguide having a predetermined birefringence, in such a manner as to produce Stokes and anti-Stokes waves along the fast axis of said waveguide through enhanced phase matched four photon mixing.

22. A method of generating new wavelengths of optical radiation comprising the step of launching coherent optical radiation at a first frequency having a predetermined polarization into a birefringent optical waveguide having a predetermined birefringence and having a fast axis and a slow axis, said predetermined polarization being at an angle with respect to said fast axis or said slow axis so as to transfer a predetermined percentage of said optical radiation into both said slow axis and said fast axis, thereby generating new wavelengths of optical radiation frequency-shifted with respect to said first frequency by shifts as small as on the order of 20 $cm^{-1}$.

23. An apparatus for the tunable generation of new wavelengths of optical radiation from at least one source of narrowband coherent optical radiation having at least one predetermined wavelength, comprising:

a birefringent optical waveguide having a fast axis and a slow axis and a birefringence value greater than $1.0 \times 10^{-6}$;

input means positioned adjacent to said waveguide for focusing and transferring optical radiation from said source into said waveguide; and polarization control means disposed along an optical path between said source and said input means for controlling the polarization of optical radiation transferred from said source to said waveguide such that the polarization of said coherent optical radiation is at an angle of at least 5° with respect to said fast or slow axis.

24. The apparatus as recited in claim 23 wherein said birefringent optical waveguide has a birefringence value greater than $1.0 \times 10^{-5}$.

25. The apparatus as recited in claim 23 further comprising birefringence alteration means for controllably changing the birefringence of said waveguide by a predetermined amount.

26. The apparatus of claim 25 wherein said birefringence alteration means comprises stress means operatively coupled to said waveguide for controllably applying predetermined amounts of mechanical stress to said birefringent waveguide.

27. The apparatus of claim 25 wherein said birefringence alteration means comprises means for temperature control operatively connected to said birefringent waveguide for selectively altering the temperature of said waveguide to predetermined levels.

28. The apparatus of claim 23 wherein said birefringent optical waveguide comprises a prestressed silica optical fiber.

29. The apparatus of claim 28 wherein said silica optical fiber has at least one metallic cladding thereon.

30. The apparatus of claim 23 wherein said waveguide is a planar optical waveguide structure composed of a bulk crystalline material.

31. The apparatus of claim 23 wherein said input means comprises a lens capable of focusing optical radiation within the numerical aperture of said waveguide.

32. The apparatus of claim 23 wherein said polarization control means comprises a quarterwave plate and a Glan-Thompson rotator.

33. The apparatus of claim 23 wherein said polarization control means comprises:

electro-optic means disposed along the optical path between said source and said input means; and voltage control means operatively connected to said electro-optic means for selectively controlling the polarization alignment of optical radiation traversing said electro-optic means.

34. The apparatus of claim 23 further comprising output means positioned adjacent to said waveguide on the opposite end from said input means for transferring optical radiation from said waveguide to other apparatus.

35. The apparatus of claim 34 further comprising second polarization control means positioned adjacent to said output means.

36. An apparatus of claim 23 wherein said at least one source of optical radiation comprises:
at least one solid state narrowband laser source.

37. An apparatus for the tunable generation of new wavelengths of optical radiation from at least two input sources of narrowband coherent optical radiation having at least two predetermined wavelengths, comprising:
a birefringent optical waveguide having a fast axis and a slow axis and a birefringence value greater than $1.0 \times 10^{-6}$;
input means positioned adjacent to said waveguide for focusing and transferring optical radiation from said at least two input sources into said waveguide; and
polarization control means disposed along an optical path between said at least two input sources and said input means for controlling the polarization of optical radiation transferred from said at least two input sources to said waveguide such that the polarization of said coherent optical radiation is at an angle of at least 5° with respect to said fast or said slow axis.

38. The apparatus of claim 37 further comprising Stokes and anti-Stokes coupling means disposed along said optical path for directing optical radiation having generated wavelengths, and input source wavelengths along separate optical paths which are wavelength dependent.

* * * * *